United States Patent [19]

Harbaugh et al.

[11] 4,081,842
[45] Mar. 28, 1978

[54] FACSIMILE SYSTEM

[75] Inventors: Steven K. Harbaugh, Diamond Bar; Richard E. Amtower, Laguna Niguel, both of Calif.

[73] Assignee: Eocom Corporation, Irvine, Calif.

[21] Appl. No.: 695,921

[22] Filed: Jun. 14, 1976

[51] Int. Cl.² .................... H04N 1/12; H04N 1/36
[52] U.S. Cl. .................................. 358/256; 358/264; 358/293; 358/294; 358/901
[58] Field of Search ............... 358/285, 286, 289, 294, 358/256, 264, 293

[56] References Cited

U.S. PATENT DOCUMENTS

| | | | |
|---|---|---|---|
| 3,584,144 | 6/1971 | Shepard | 358/294 |
| 3,849,592 | 11/1974 | Rosenheck | 358/289 |

Primary Examiner—Howard W. Britton
Attorney, Agent, or Firm—Flehr, Hohbach, Test, Albritton & Herbert

[57] ABSTRACT

Disclosed is a facsimile system having a transmitter for optically scanning input copy to produce modulated electrical signals to be transmitted to a receiver. The receiver responsively controls output optical scanning to form output copy as a reproduction of the input copy. Signal processing in both the transmitter and receiver employs spatial coding. In the transmitter scanner, a spatially coded reference signal, generated by the scanning beam and a spatial mask, is employed. In the receiver scanner, a spatially coded reference signal, generated by the scanning beam and an identical spatial mask is employed also. Therefore, the transmitter and receiver scanners are spatially synchronized without the need for real-time synchronization.

23 Claims, 13 Drawing Figures

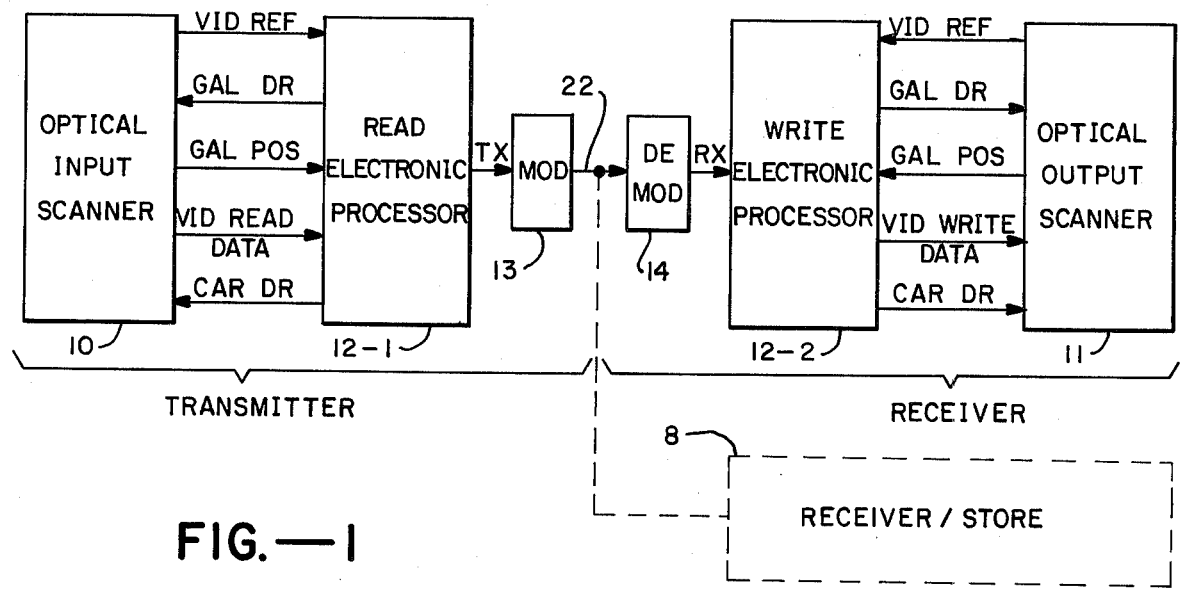
FIG.—1
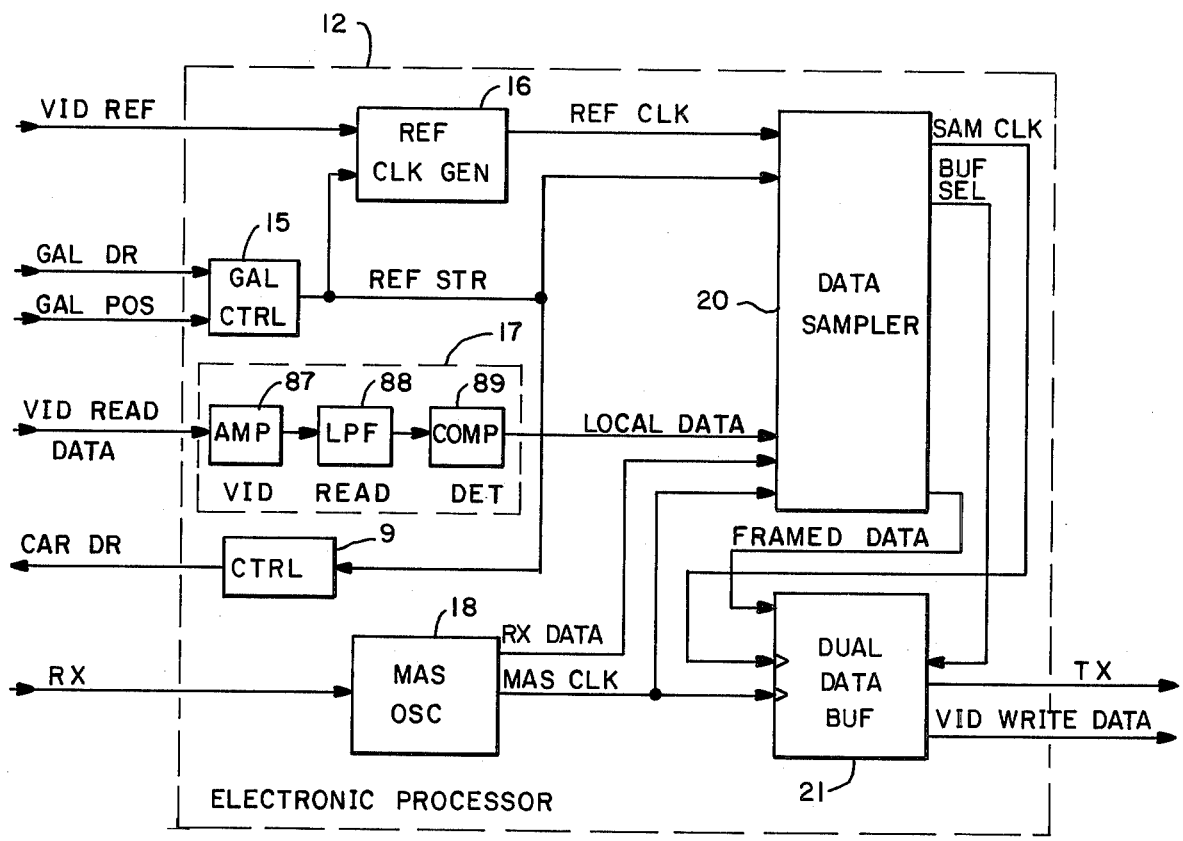
FIG.—2

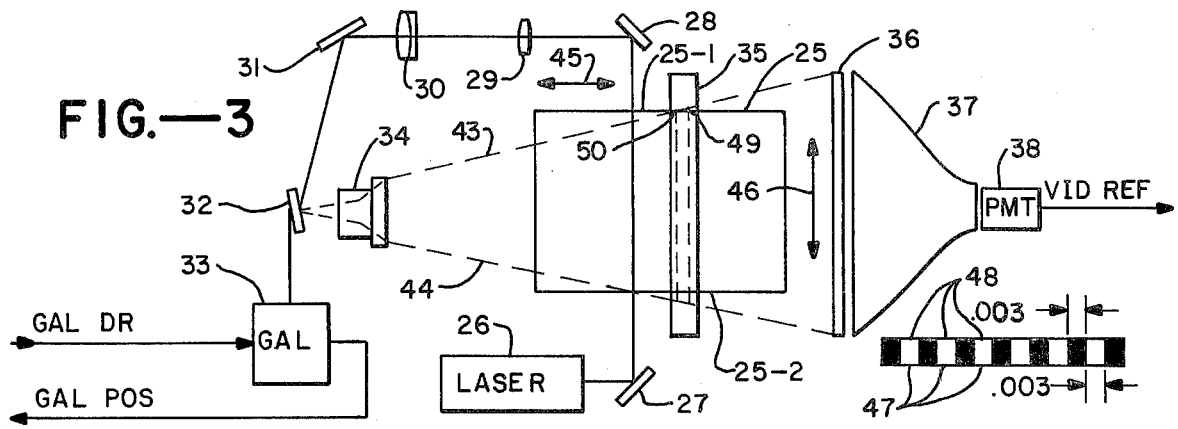
FIG.—3
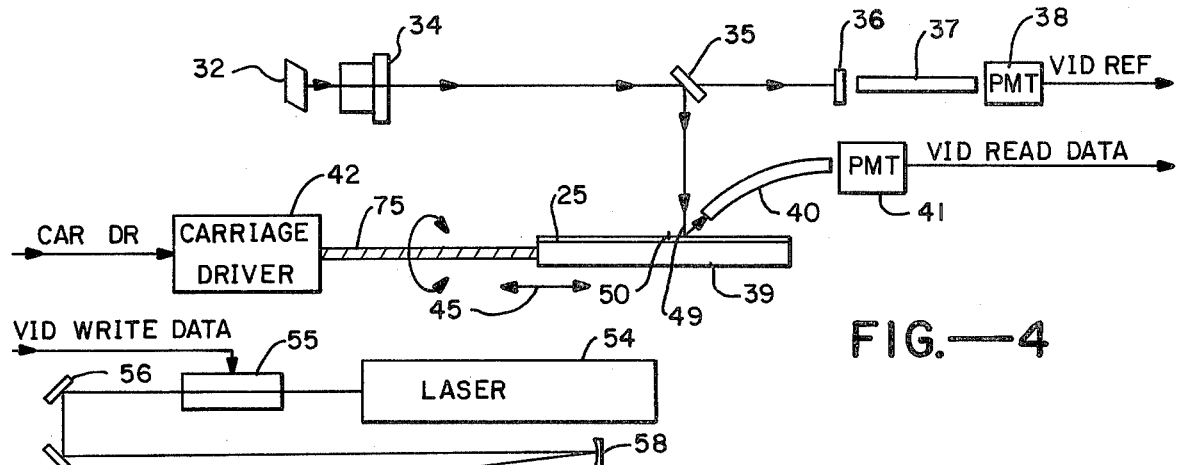
FIG.—3a
FIG.—4
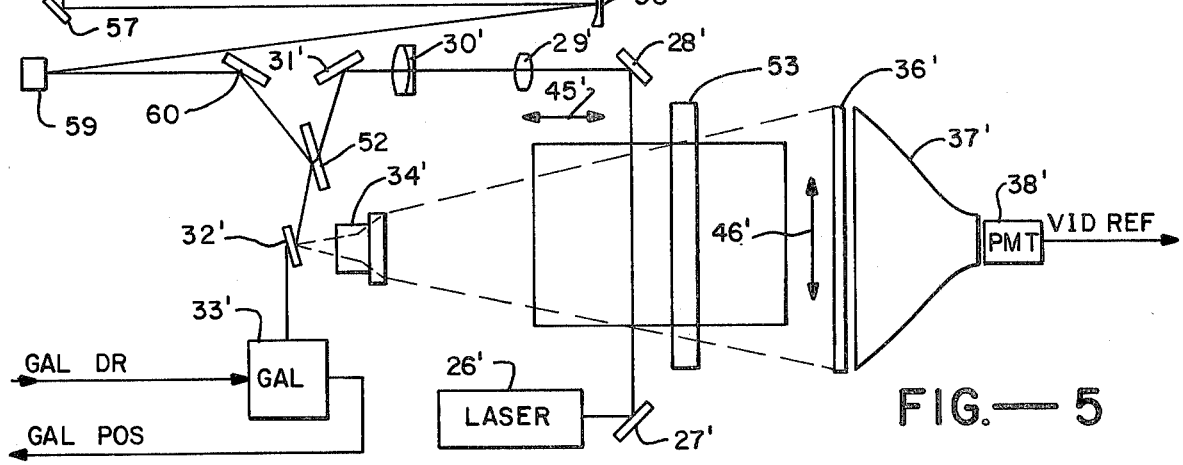
FIG.—5
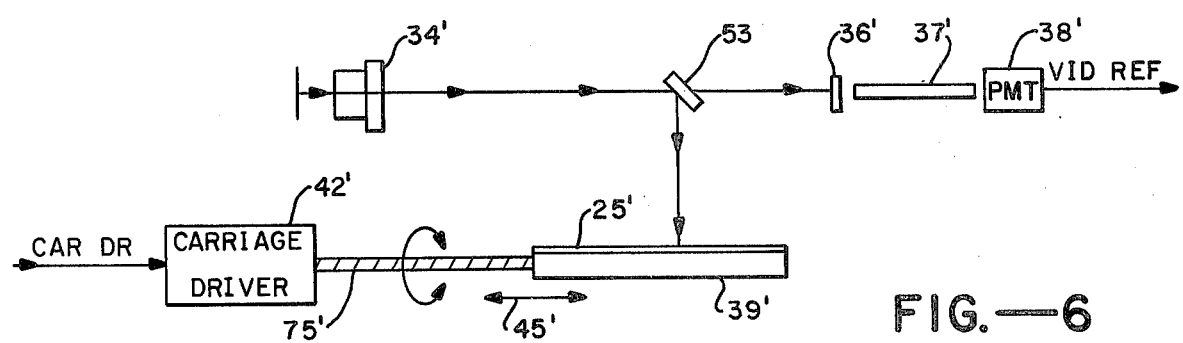
FIG.—6

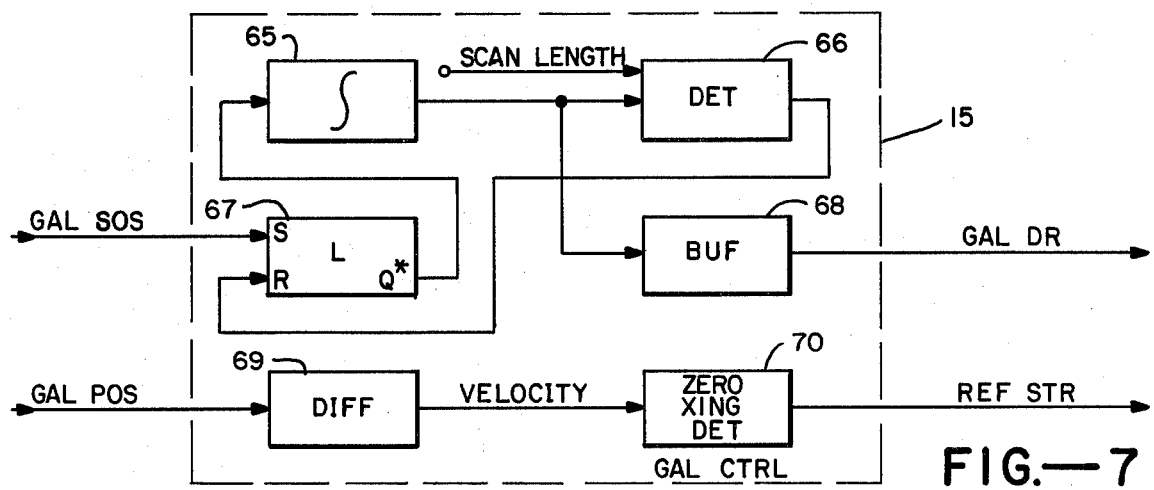
FIG.—7
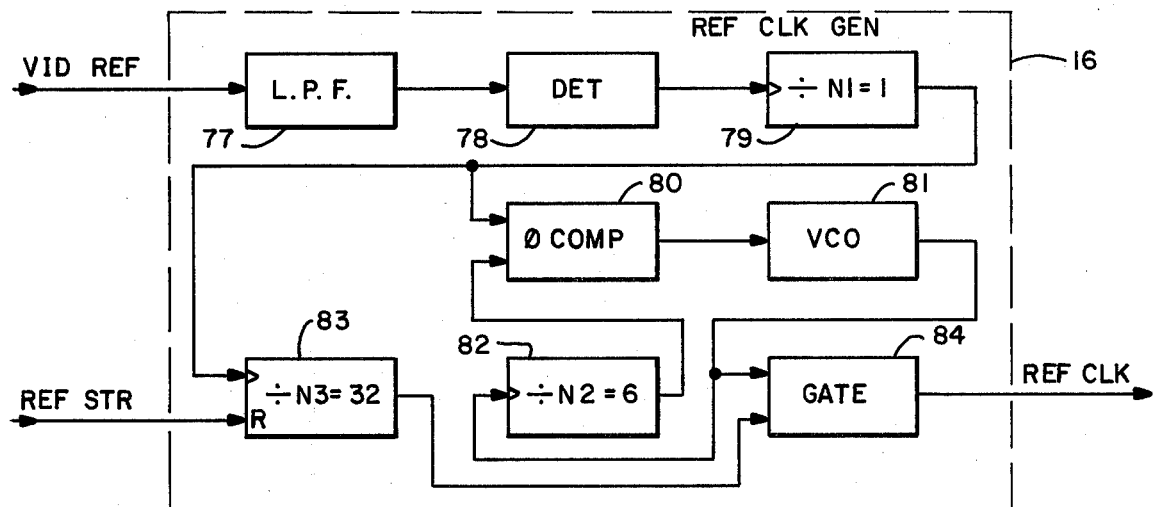
FIG.—8
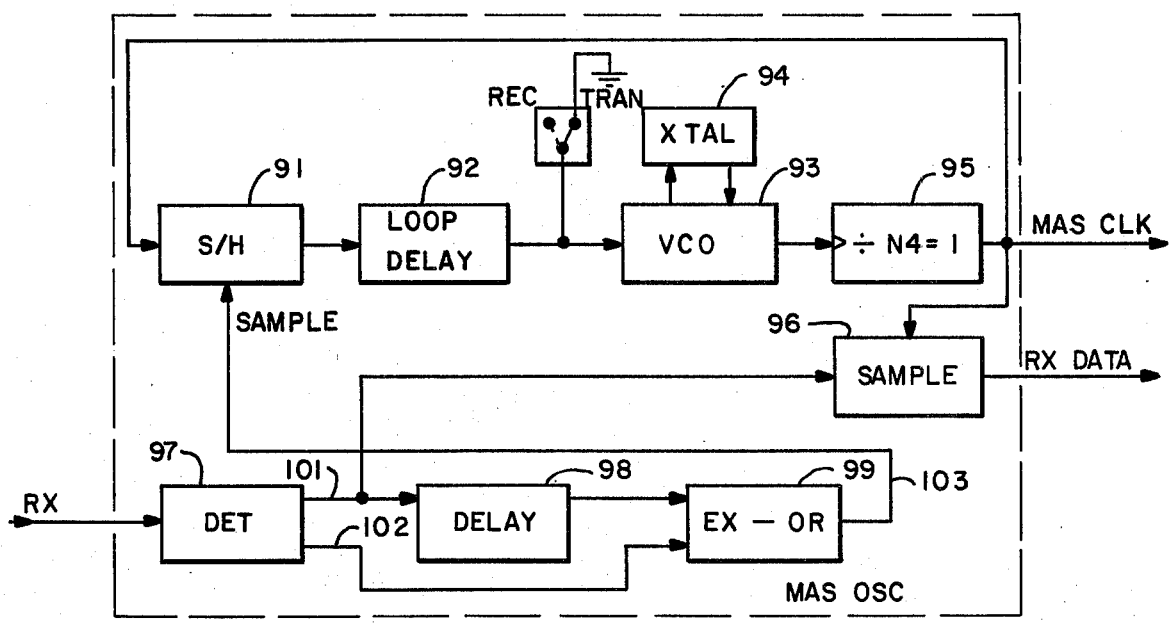
FIG.—9

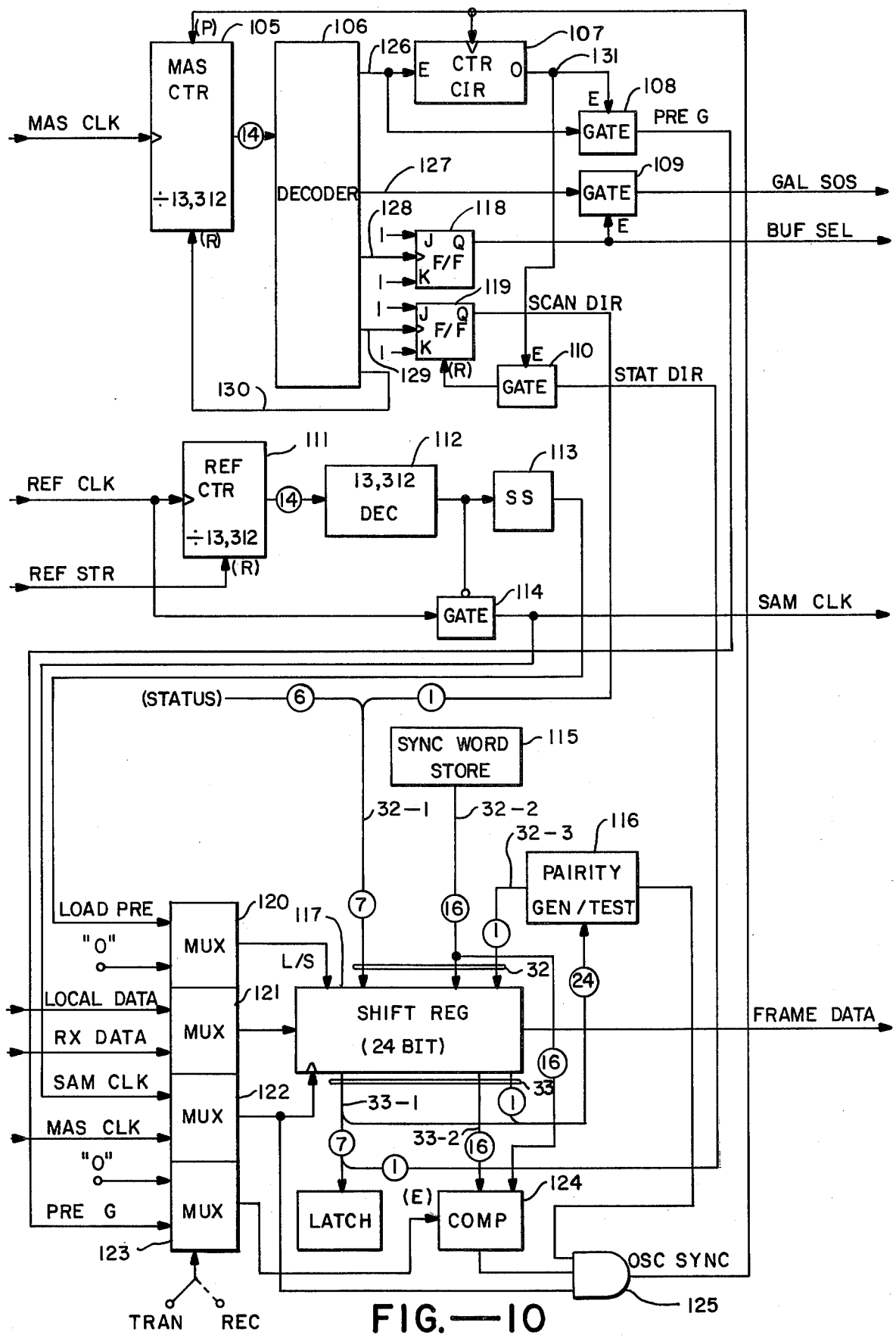
FIG.—10

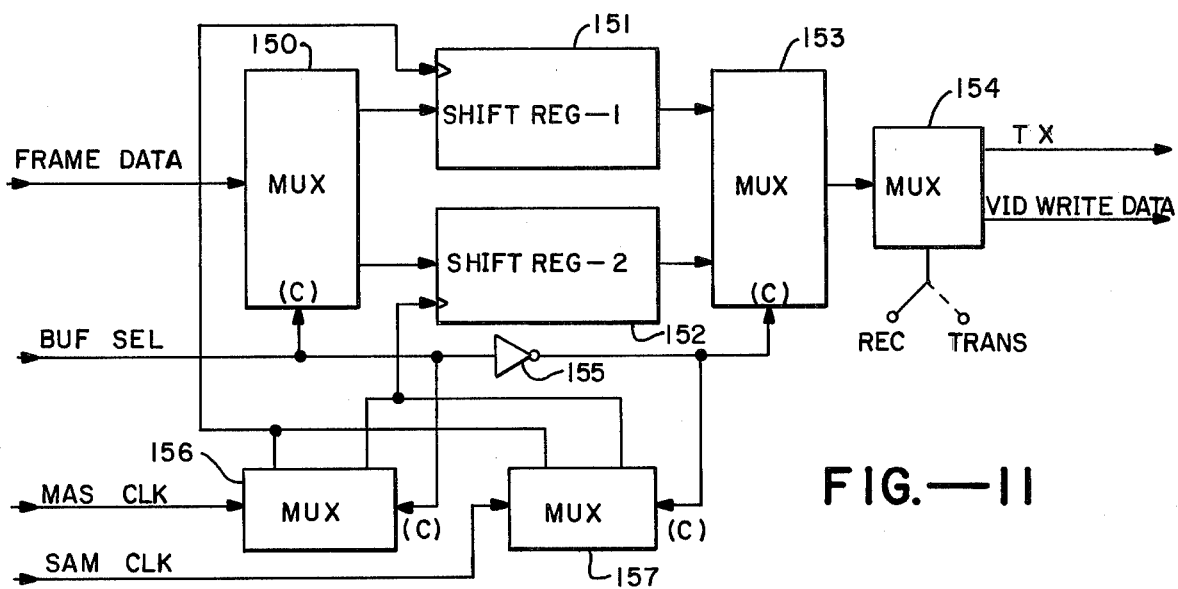
FIG.—11
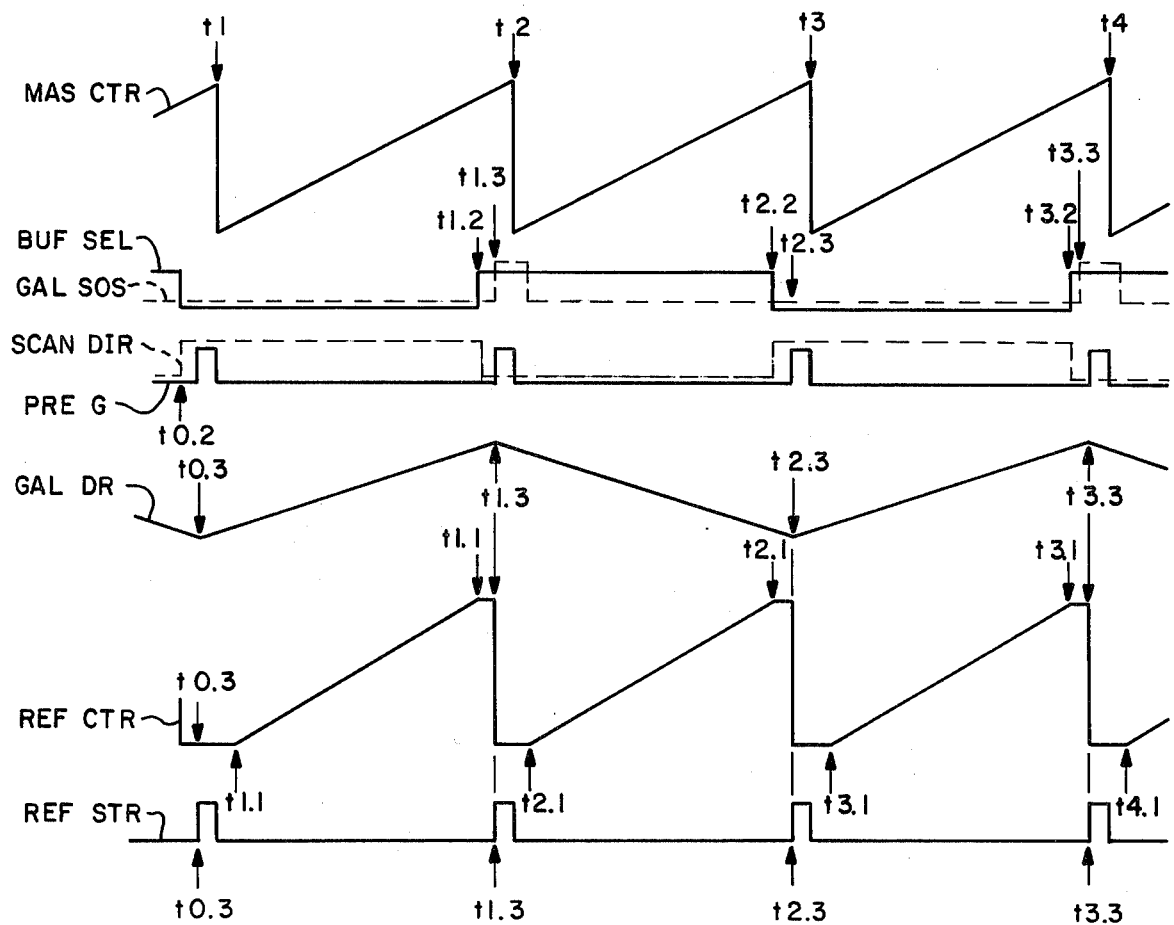
FIG.—12

FACSIMILE SYSTEM

CROSS REFERENCE TO RELATED APPLICATION

*Laser Read/Write System For The Production of Engravings* invented by Richard E. Amtower, Ser. No. 522,103, filed Nov. 8, 1974, and assigned to EOCOM Corp.

BACKGROUND OF THE INVENTION

The present invention relates to facsimile transmission systems and particularly to optical scanning systems having spatial synchronization.

Facsimile systems typically scan input copy at a transmitter to form a transmission signal and scan output copy in a receiver in response to the transmission signal. Prior art systems typically have required a rigorous time synchronization between the transmitting station and the receiving station to insure that the output copy is an accurate reproduction of the input copy. A highly accurate electrical clock establishes a reference frequency in the transmitter and a corresponding clock establishes a reference frequency in the receiving station. Although time synchronization between the transmitter and receiver reference frequencies is readily achieved, synchronization problems still arise because of non-uniformity in the scanning mechanisms in the transmitters and receivers. Such non-uniformities result in errors in the output copy when compared with the input copy.

Improvements have been made in optical scanners for use in scanning systems. Ore such improved scanning system employs a combination of ultraviolet and visible laser beams. Such a system is described in the above cross-referenced application. Notwithstanding the improvements in optical scanning systems, problems of spatial synchronization still remain in facsimile systems. Improvements to overcome the existence of spatial nonuniformity are still needed. Additionally, freedom from reliance on time synchronization is desirable in order to achieve greater flexibility of operation of facsimile systems.

In accordance with the above background of the invention, it is an objective of the present invention to provide an improved facsimile system in which spatial errors between the scanned input and output copy are reduced and in which time synchronization is not required.

SUMMARY OF THE INVENTION

The present invention is a facsimile system including an input scanner in a transmitter for scanning input copy and including an output scanner in a receiver for scanning output copy. Signals are transmitted from the input scanner to the output scanner employing spatial synchronization to insure that the output copy is an accurate reproduction of the input copy.

In accordance with the present invention, an optical scanner spans the input copy with a scanning spot of incident light. The resulting reflected light is detected to produce a video read data signal. The incident light is detected through a spatial mask to provide a transmitter video reference signal. The reference signal is utilized to gate the video read data signal before transmission to the receiver. In the receiver an optical scanner is controlled by a video write data signal. The viedo write data signal gates a scanning spot of light on and off to expose the output copy. Scanning light also is detected through a spatial mask to provide a receiver video reference signal. The reference signal is utilized to gate the signal received from the transmitter to form the video write signal. The spatial masks in the transmitter and receiver have a known relationship (e.g. identical) so that the scanning of the output copy in the receiver is spatially synchronized with the scanning of input copy in the transmitter.

In accordance with one enmbodiment of the present invention, the transmitter and receiver each includes a flying spot optical scanner in the form of a laser for generating a light beam and a galvanometer-positioned mirror for scanning the incident light.

In accordance with one embodiment of the present invention, the spatial mask includes an array of alternating transparent and opaque bars. The scanning incident light spot has a size relative to the width of the bars so that light is alternately blocked and transmitted as the the incident light scans the mask. The light transmitted by the mask is detected to form the video reference signa as a two-state electrical signal having an on state corresponding to transmission and an off state corresponding to non-transmission through the mask.

In one embodiment, the transmitter and receiver each include an electronic processor. The transmitter processor includes means for gating the video read data signal with the transmitter viedo reference signal. The receiver processor includes means for gating the video write data signal with the receiver reference signal. The processors include means for framing the transmitted and received signals to establish synchronization between lines of scan in the transmitter and receiver. The electronic processors also include dual data buffers. Information is loaded into the buffer in the case of the transmitter and read out from the buffer in the case of the receiver in synchronism with and at the frequency of the spatially coded video reference signals. Data is gated out from the transmitter and into the receiver buffers at a frequency different than the video reference signal frequency. Accordingly, operation of the transmitter and the receiver are time independent without any loss of spatial synchronization. This time independent feature of the present invention is particularly significant where one central transmitter is transmitting to a plurality of receivers since real-time synchronization between each of the receivers is not required.

In accordance with another feature of the present invention, means are provided for inserting control or other information into the data stream at any time.

In accordance with another aspect of the present invention, half-tone synthesis is provided by continuous encoding from full tone to half tone.

In accordance with the above summary of the invention, the present invention achieves the object of providing an improved facsimile system having spatial synchronization.

BRIEF DESCRIPTION OF THE DRAWINGS

FIG. 1 depicts an overall block diagram of a facsimile system in accordance with the present invention.

FIG. 2 depicts a schematic electrical block diagram of the electronic processor for both the transmitter and receiver of the facsimile system of FIG. 1.

FIG. 3 depicts a schematic top view representation of the optical input scanner of the FIG. 1 system.

FIG. 4 depicts a schematic front view of the input scanner of FIG. 1.

FIG. 5 depicts a schematic top view of the optical output scanner of the FIG. 1 system.

FIG. 6 depicts a schematic front view of the output scanner of FIG. 1.

FIG. 7 depicts an electrical schematic representation of the galvanometer control (GAL CTRL) of the processor of FIG. 2.

FIG. 8 depicts an electrical schematic representation of the reference clock generator (REF CLK GEN) within the processor of FIG. 2.

FIG. 9 depicts an electrical schematic representation of the master oscillator (MAS OSC) of the processor of FIG. 2.

FIG. 10 depicts an electrical schematic representation of the data sampler of the processor of FIG. 2.

FIG. 11 depicts an electrical schematic representation of the dual data buffer of the processor of FIG. 2.

FIG. 12 depicts schematic representations of electrical waveforms representative of the operation of the facsimile system of the present invention.

DETAILED DESCRIPTION

Overall System — FIG. 1

In FIG. 1, the facsimile system includes an optical scanner 10, a read electronic processor 12-1, and a data modulator 13 which together form the transmitter. The modulator 13 connects over a transmission line 22 to a demodulator 14. The demodulator 14, the write electronic processor 12-2 and an optical recorder 11 form the receiver system.

In FIG. 1, the optical scanner 10 includes means for generating a spatial reference signal VID REF. That spatial reference signal is utilized in the electronic processor 12-1 to sample the data signal VID READ DATA generated by the optical scanner 10. The electronic processor 12-1 receives a galvanometer position signal GAL POS from the scanner 10 which is an indication of the line scan position of the input scanner 10. The read processor 12-1 generates a drive signal GAL DR for driving the scanner 10 in a first direction and a carriage drive signal CAR DR for driving the scanner in a second direction orthogonal to the first direction. The video data signal, when gated by the video reference signal, contains information for the accurate reproduction of the input copy scanned by scanner 10. The gated data signal TX contains spatial synchronization information and is connected for transmission by the modulator (MOD) 13.

Modulator 13 is any conventional modulator. Modulator 13 connects over any conventional transmission line 22 to a conventional demodulator 14.

The output from the demodulator 14 is the received signal RX. The received signal RX connects as an input to the write electronic processor 12-2. The processor 12-2 processes the received signal RX to provide a data signal VID WRITE DATA which is employed by the optical output scanner 11 to scan the output copy. The signal RX is gated by a spatially coded video reference signal VID REF to form the VID WRITE DATA signal. In this manner, the output copy produced by the output scanner 11 is a spatially accurate reproduction of the input copy scanned by the input scanner 10.

The write processor 12-2 produces a galvanometer drive signal GAL DR to drive the output scanner and receives back a galvanometer position signal GAL POS which indicates the line position in a first direction of the output scanner. The processor 12-2 also provides a drive signal CAR DR for driving the output scanner 11 in a second direction orthogonal to the first direction.

The read electronic processor 12-1 and the write electronic processor 12-2 are substantially identical. The read electronic processor 12-1 does not employ the RX signal of the VID WRITE DATA signal. Similarly, the write electronic processor 12-2 does not employ the TX and the VID READ DATA signals.

The facsimile system of FIG. 1 functions to scan input copy in the optical scanner 10 producing a data signal and a spatially encoded reference signal. These signals after processing in processor 12-1 are transmitted to the receiver. The receiver in turn is responsive to the received signal to form a write data signal by gating the received signal in processor 12-2. with a spatially coded reference signal. Because of the correspondence between the spatially coded reference signals in both the transmitter and receiver, the write data signal controls the output scanner 11 to form an output copy which is a spatially accurate reproduction of the input copy.

Electronic Processor — FIG. 2

In FIG. 2, the electronic processor 12 is shown which is utilized for both the read electronic processor 12-1 and the write electronic processor 12-2 of FIG. 1.

The electronic processor 12 of FIG. 2 includes a reference clock generator (REF CLK GEN) 16 which functions to receive the spatially coded VID REF signal to generate a REF CLK signal. The REF CLK signal produces a sample clock signal SAM CLK when the proper framing relationship is established by the data sampler 20.

In FIG. 2, the galvanometer control (GAL CTRL) 15 functions to generate the galvanometer drive signal GAL DR for driving the input scanner in the first direction. The galvanometer position signal GAL POS is received by the control 15 to generate the reference strobe signal REF STR. The REF STR signal functions to control operation of the reference clock generator 16 and the data sampler (DATA SAM) 20.

The video read detector (VID READ DET) 17 receives the VID READ DATA signal from the optical scanner 10 and produces a LOCAL DATA signal. The video read detector 17 is only utilized in the read electronic processor 12-1 of FIG. 1 and not in the write electronic processor 12-2. Detector 17 includes a conventional amplifier (AMP) 87 a low pass filter (LPF) 88 typically having a cut-off frequency of $6 \times 10^6$Hz, and a conventional squaring comparator (COMP) 89.

In the read electronic processor 12-1, the local data from detector 17 is sampled by the sample clock signal SAM CLK generated in sampler 20 and is loaded into sampler 20. The data sampler 20 includes a preamble generator which attaches a preamble to the data. The sampled local data and any preamble data are output as the FRAME DATA to the dual data buffer (DUAL DATA BUF) 21. The buffer 21 receives the FRAME DATA at the clock rate of the SAM CLK signal.

The FRAME DATA is transferred out of the buffer 21 as the transmitted data signal TX at the rate controlled by the master clock signal MAS CLK. The master clock signal is generated by the master oscillator (MAS OSC) 18.

The master oscillator 18 functions in the read electronic processor merely to produce the master clock signal as a fixed frequency output from a crystal controlled oscillator. The RX signal is not an input to the circuit 18 in the transmitter configuration of processor 12-1.

In FIG. 2, when the electronic processor 12 is utilized as the write electronic procesor 12-2 in FIG. 1, the master oscillator 18 receives the RX signal and produces as an output the RX DATA signal. The RX DATA signal is input to the data sampler 20 in place of the LOCAL DATA signal which is not utilized in the receiver. Also the master oscillator clock signal MAS CLK is generated by oscillator 18 using a phase-locked loop to follow the data rate of the RX input. In the receiver configuration, the RX DATA is loaded into the data sampler 20 at the MAS CLK data rate.

The RX DATA is transferred from the data sampler 20, as the FRAME DATA, into the dual data buffer 21. The FRAME DATA in the dual data buffer 21 is gated out under control of the SAM CLK signal to form the VID WRITE DATA. The SAM CLK signal includes the coded spatial information derived from the REF CLK signal and properly framed in data sampler 20.

The VID WRITE DATA signal is connected to the optical output scanner 11 of FIG. 1 to modulate the scanning output light beam which exposes the output copy.

Further details of the electronic processor 12 of FIG. 2 are described hereinafter in connection with FIGS. 7 through 11.

Optical Input Scanner — FIGS. 3 and 4

In FIG. 3, a top view of the input scanner 10 of FIG. 1 is shown. A document or other input copy 25 is positioned as indicated so as to be scanned by the FIG. 3 system. Light to scan copy 125 is generated by laser 26. In a typical embodiment, laser 26 is an HeNe laser operating at 6328 angstroms. Light from laser 26 is folded back by the high efficiency folding mirrors 27 and 28. Light from mirror 28 passes through the beam expanders 29 and 30 to produce an output beam from lens 30 which is approximately 5 centimeters in diameter in one embodiment. The folding mirror 3 directs the beam onto the scanning mirror 32. Mirror 32 is typically a beryllium device which also acts as a spatial filter for the system. The beam impinging upon the mirror 32 is approximately 5 centimeters in diameter and the mirror is approximately 3.5 centimeters in diameter in a typical embodiment.

The beam reflected from the mirror 32 passes through a large apperture field flattening lens 34. The purpose of the lens 34 to focus the beam onto the copy 25 and onto the position reference mask 36. Both the copy 25 and mask 36 are at the focal length of lens 34. The beam splitter 35 splits the light beam between the copy 25 and the mask 36 as can be observed more clearly in FIG. 4.

In FIG. 4, the light beam from mirror 32 passes through the lens 34 to the beam splitter 35. From the beam splitter 35, light continues to the position mask 36 and is directed orthogonally toward the copy 25. The incident light on both copy 25 and mask 36 is a spot having a diameter of approximately 0.003 inch in a typical embodiment.

The mask 36 extends the full width of the document field to be scanned. As shown in FIG. 3(a), the mask 36 includes alternately spaced opaque bars 47 and transparent bars 48 which are each 0.003 inch in width in a typical embodiment.

The function of the mirror 32 and galvanometer 33 is to scan the beam from mirror 31 back and forth between the extreme ray positions 43 and 44, as the beam travels from ray position 43 to ray position 44 and then returns. The beam incident on the mask 36 alternately impinges upon a transparent bar and an opaque bar. The diameter of the incident scanning beam is approximately the same as the width of each transparent bar and opaque bar. Therefore, the fiber optic bundle 37 is alternately illuminated and dark. The photo-multiplier tube (PMT) 38 senses the light and dark conditions to provide a spatial reference signal VID REF having logic 1 and 0 levels, respectively. At the same time that one incident beam is scanning across mask 36, the other portion of the beam from beam splitter 35 is scanning across the copy 25. The light incident on the copy 25 is reflected into the fiber optic bundle 40. The reflected light is modulated by the light or dark tone of the data on copy 25.

The fiber optic bundles 37 and 40 in one embodiment include fibers having a diameter of 0.002 inch stacked in a configuration of three fibers deep and running across at least the full width of the copy to be scanned.

In FIG. 3, the fiber optic bundle 37 is like the fiber optic bundle 40 in FIG. 4 except that it is positioned to receive light transmitted through the mask 36. The fiber optic bundles 37 and 40 are each collected down to provide an input to a photo-multiplier tube (PMT) 38 and 41, respectively.

The photo-multiplier tube 38 provides as its output the spatially encoded signal VID REF.

The photo-multiplier tube 41 senses the light from bundle 40 to provide as its output the video read data signal VID READ DATA. The VID READ DATA signal has a logic 0 or logic 1 level which varies as a function of the tone, (black or white) respectively, of the copy 25.

The galvanometer 33 is a conventional device which oscillates the mirror 22 under control of the GAL DR signal. As the GAL DR signal increases from a minimum to a maximum and then returns from a maximum back to a minimum, the light beam is scanned from light ray position 43 to light ray position 44 and then back from position 44 to position 43 and so on in a first direction parallel to line 46. A scan from position 43 to position 44 is a scan of a first line 49. When the spot is then scanned back from position 44 to position 43, a second line 50 of the copy 25 is scanned. In order for the second line scan not to cover the same line as the first scan, the copy 25 is moved in a second direction parallel to line 45 which is orthogonal to the first direction of line 46. In FIG. 3, line 50 becomes positioned where line 49 was positioned.

Movement of the copy 25 is controlled, as indicated in FIG. 4, by the carriage driver 42. Carriage driver 42 translates the carriage 39 and therefore the copy 25 in a direction parallel to arrow 45 which is orthogonal to the scanning direction of the flying spot. Driver 42 is typically a stepping motor which steps a distance representing the displacement between two lines (such as 49 and 50) for each pulse on the CAR DR line. When driver 42 is stepped, the lead screw 75 turns to cause carriage 39 to translate.

The carriage drive signal CAR DR is produced by the electronic processor 12-1 of FIG. 1 for each line scanned.

In a typical embodiment, the size of copy 25 is approximately 50X70 centimeters.

The scanning rates in a typical system are, in the direction of arrow 461,000 bits per inch. Each line in the direction of arrow 46 is defined to be 13,312 bits long.

The galvanometer and carriage are driven so as to scan 150 lines per second.

Optical Output Scanner — FIGS. 5 and 6

In FIG. 5, a schematic top view of the optical output scanner 11 of FIG. 1 is shown. In FIGS. 5 and 6, the numbered elements having primes correspond to the unprimed numbered elements of FIGS. 3 and 4. The primed elements in FIGS. 5 and 6 operate in the same manner and for the same purpose as the unprimed like-numbered elements of FIGS. 3 and 4.

FIG. 5 includes a write laser 54. In a typical embodiment, laser 54 is an argon ion laser which is air-cooled and has a 10 milliwatt power output at 4880 angstroms. The output beam from the laser 54 passes through an accousto-optic modulator 55. Modulator 55 is a conventional device which has an extinction ratio greater than 100 to 1. Modulator 55 is controlled by the VID WRITE DATA signal. Whenever the VID WRITE DATA signal is a logical 1, the laser beam is transmitted by the modulator 55. When that signal is a logical 0, the laser beam is not transmitted although some leakage occurs. When the modulator 55 allows transmission, the output beam is folded by conventional folding mirrors 56 and 57 and is directed to the lens 58. Typically an absorber (not shown) is placed in front of the lens 58 to stop any leakage through modulator 55 when the VID WRITE DATA signal is a logical 0. The lens 58 and the lens 59 comprise a beam expander which form a beam having a diameter of approximately 5 centimeters. The folding mirror 60 and the dichroic mirror 52 direct the beam from laser 54 onto the galvanometer mirror 32. The beam expander is employed to optimize f-number and decrease beam divergence. The galvanometer mirror 32 acts as a spatial filter for both light from laser 54 and light from laser 26′.

Light from the folding mirror 31′ passes through the dichroic mirror 52 to the galvanometer mirror 32′.

In FIG. 6, a dichroic mirror 53 is utilized to separate the light from laser 26′ from light from laser 54. The light from laser 26′ proceeds from the scan objective lens 34′ straight through the dichroic mirror 53 to the position mask 36′, through the optical bundle 37′ to the photo-multiplier tube 38′. The output from the photo-multiplier tube 38′ is the VID REF signal.

The light from laser 54 passes through the scan objective lense 34′ and is directed at right angles by the dichroic mirror 53 toward the write carriage to expose copy 25′. The copy 25′ in a typical example is AgFa071 photographic film.

Galvanometer Control—FIG. 7

In FIG. 7, the galvanometer control (GAL CTRL) 15 of the processor of FIG. 2 is shown in more detail. The control 15 includes a set/reset latch (L) 67 which receives the start of scan signal GAL SOS on the set (S) input. The Q output of the latch 67 connects as the input to the integrator 65. Integrater 65 functions to integrate towards either a positive level or a negative level depending upon the 1 or 0 Q output level, respectively, from the latch 67. The output from integrator 65 is therefore a positive going ramp or a negative going ramp depending upon the output from latch 67. The output from integrater 65 is connected to the conventional threshold detector 66. When the output from integrator 65 reaches a minimum level (determined by the "SCAN LENGTH" input setting), detector 66 provides an output which connects to the reset (R) input of latch 67 and resets latch 67. When latch 67 is reset, it causes the integrator to reverse its direction and start moving toward the maximum level away from the minimum level.

The output from integrator 65 connects through the buffer 68 to form the GAL DR signal. A typical waveform for the GAL DR signal is shown in FIG. 12.

In FIG. 7, control 15 also includes differentiator 69 and a zero crossing detector 70. The differentiator 69 receives the GAL POS signal from the galvanometer of either FIG. 3 or FIG. 5. The differentiated GAL POS signal output from differentiator 69 has a zero crossing each time the galvanometer changes direction at the extreme end of a scan. The extreme end of a scan for the galvanometer is detected by detector 70 to provide an output reference strobe signal REF STR.

Reference Clock Generator—FIG. 8

In FIG. 8, the reference clock generator 16 of the processor of FIG. 2 is shown in further detail.

The reference signal VID REF is an input to the low pass filter (LPF) 77. Filter 77, in a typical embodiment has a cut-off frequency of $6 \times 10^6$Hz. The output of filter 77 connects to the detector 78. Detector 78 is a conventional device for squaring the output from filter 77 to form uniform transitions between 1's and 0's in the detector output.

The output from detector 78 forms the clocking input to a counter 79 which divides the number of clocking input pulses by a quantity equal to N1. In a typical example explained, the counter N1 has a value of 1 so that the function of counter 79 can be ignored. The output from counter 79 is connected as one input to the phase comparator 80 and as a clocking input to the divide-by-N3 counter 83.

Phase comparator 80 compares the phase of the output of counter 79 with an output from divide-by-N2 counter 82. In the particular example explained, N2 is equal to 6. Counter 82 is clocked by the output from voltage controlled oscillator (VCO) 81. The output frequency from oscillator 81 varies as a function of the phase difference between the output counter 79 and counter 82. The operation of counters 79 and 82, the phase comparator 80 and the oscillator 81 is to provide an output from oscillator 81 which is six times the frequency of the output from counter 79. The output from oscillator 81 is gated through gate 84 as the reference clock signal REF CLK. The REF CLK signal is available only when gate 84 is enabled by the output from counter 83. Counter 83 is a divide-by-N3 counter. In the present example, N3 is equal to 32. The effect of counter 83 is to delay the reference clock output from gate 84 for the first 32 counts from counter 79 after the counter 83 has been reset. Counter 83 is reset by the reference strobe signal REF STR.

Master Oscillator—FIG. 9

The appratus of FIG. 9. functions as a fixed frequency ($6 \times 10^6$Hz) oscillator in the read electronic processor 12-1. In the write electronic processor 12-2 the apparatus of FIG. 9 operates as a bit synchronizer using a phase-locked loop to synchronize on the bit rate of the received data RX. When used in the write electronics, the RX data is input to a conventional threshold detector 97. Detector 97 has complementary outputs on output lines 101 and 102 depending upon the 1 or 0 logic level of the input data RX. The output on line 101 is input to the one bit delay 98. The delayed signal on line 102 and the complementary nondelayed signal on line 102 are compared in the exclusive-or circuit 99. whenever the delayed and nondelayed circuits change from the same logic level to a different logic level, an output is generated on line 103 which strobes the sample and hold (S/H) circuit 91. Circuit 91 is part of the phase-locked loop which includes the loop delay 92, the voltage control oscillator (VCO) 93 and the counter 95. Counter 95 is a divide-by-N4 counter. In the particular example described, N4 is equal to 1. Voltage control oscillator 93 is crystal controlled by the crystal 94 at a frequency of $6 \times 10^6$Hz whenever the input to the VCO is grounded at the TRANS connection. Whenever the input to the oscillator 93 is open at the REC connection, the oscillator 93 receives the output from the loop delay 92. The phase-locked loop maintains the output frequency from counter 95 equal to the input bit frequency of the received data RX. This output frequency is the frequency of the master clock signal MAS CLK. The MAS CLK signal gates the data on line 101 to form the RX DATA signal.

In FIG. 10, the data sampler 20 of FIG. 2 is shown in further detail. The master counter 105 is a divide-by-13,312 counter. Counter 105 is clocked by the master counter clock signal MAS CLK. Counter 105 is reset, on the R input, by a 13,312 decoded output from the decoder 106 on line 130. Counter 105 is preset to a pre-established count (0 in the present example) by a signal on the OS SYNC line connected at the P input. The 14 bit parallel output from counter 105 connects to a conventional decoder 106. Decoder 106 decodes various counts of counter 105. The output on line 130 is a decode of the count 13,312. Each of the outputs on lines 126, 127, 128 and 129 are also decoded at or near the 13,312 count. In practice, the decoded outputs are shifted relative to the 13,321 count in order to provide for conventional timing delays necessary in any practical system. For purposes of explanation, however, they all occur substantially at the 13,312 count.

Counter circuit 107 includes an up/down counter for counting OSC SYNC pulses having a minimum count of 0 and a maximum count of 10. Circuit 107 is enabled (logic 1) over a continuous range of decoder outputs (e.g., 3 counts out of 13,312) on line 126. For the remaining count, line 126 equals logic 0. This produces a narrow window during each frame in which the up/down counter is permitted to count OSC SYNC pulses from 125. The up/down counter counts up for each coincident OSC SYNC pulse with decoded output line 126, and counts down in the absence of an OSC SYNC pulse during a logic 1 on line 126. The output on line 131 is set to a logic 1 only when the counter output reaches the maximum count of 10. Reseting line 131 to logic 0 only occurs when the up/down counter reaches the minimum count of 0. The function of counter circuit 107 is to establish synchronization by requiring 10 concurrent OSC SYNC pulses coincident within the decoded output on line 126.

Whenever the output on line 131 from counter circuit 107 is a logic 1 the gate 108 is enabled to generate the preamble gate signal PREG at the time that the decoded output occurs on line 126. The PREG signal is connected to the multiplexer 123 in the receiver processor 12-2 to provide an enable input to the comparator 124.

The output on line 131 from counter 107 also enables gate 110 to allow the status direction signal STAT DIR to reset the flip-flop 119.

Flip-flops 118 and 119 are conventional JK flip-flops having their J and K inputs connected to logical 1's. Flip-flops 118 and 119 are clocked by the decoded outputs on lines 128 and 129 respectively from decoder 106. The signals on lines 128 and 129 appear once each cycle of the master counter 105 to toggle the flip-flops 118 and 119. Flip-flop 118 controls the BUF SEL line. Flip-flop 119 controls the scan direction of the scanning beam through the SCAN DIR line. The scanning direction in FIG. 3 is from the edge 25-1 to the edge 25-2 when SCAN DIR is a logical 1. The scanning direction in FIG. 3 is from 25-1 when SCAN DIR is a logical 0. The reset of flip-flop 119 through gate 110 is only required to establish initial synchronization or resynchronization after synchronization has been lost.

In FIG. 10, the reference counter 111 is a divide-by-13,312 counter. Counter 111 counts the clock pulses provided by the reference clock signal REF CLK. Counter 111 is reset on its R input by the reference strobe signal REF STR. The parallel output from counter 111 is decoded in the 13,312 decoder 112. Whenever decoder 112 detects the 13,312 count in counter 111, its output fires the single-shot 113 to generate the load preamble signal LOAD PRE. Also, whenever decoder 112 decodes a 13,312 count gate 114 is inhibited from passing the clock signal REF CLK to generate the sample clock signal SAM CLK. Counter 111 counts up to a count of 13,312 and holds that count until reset by operation of the REF STR signal. During the period that counter 111 is counting from 0 up to the count 13, 312, the REF CLK signal is being passed through gate 114 to form the SAM CLK signal.

In FIG. 10, the multiplexers 120, 121 and 123 each select one of two input signals depending on whether the apparatus of FIG. 10 is employed in the transmitter processor 12-1 or the receiver procesor 12-2 of FIg. 1. When the apparatus is connected in the transmitter, the upper signal for each of the multiplexers is selected and when connected in the receiver, the lower signal is selected.

The output from the multiplexer 120 connects to the load/shift (L/S) control of a 24-bit shift register 117. Shift register 24 is either parallel loaded by the 24 input bits on bus 32 or is serially loaded by the data output from multiplexer 121. The clocking rate of data input to shift register 117 or output from register 117 is established by the output from the multiplexer 122. Data is serially clocked out from shift register 117 on the FRAME DATA line. Data is available as a parallel output on 24-bit bus 33.

For transmitter operation, the LOCAL DATA line is selected by multiplexer 121 to serially step data into the shift register 117. The clock rate at which data is serially stepped into shift register 117 is established by the SAM CLK signal. In order for the data to be serially stepped into the shift register 117 during the transmssion made, the LOAD PRE signal selected by multiplexer 120 is a logical 0. The LOAD PRE is normally a 0 as the output from single-shot 113. When decoder 112 reaches a count of 13,312, the LOAD PRE signal becomes a logical 1 and thus parallel loads data over 24-bit bus 32 into register 117. Bus 32 includes 7-bit bus 32-1 available for status data. One of those 7 bits is the SCAN DIR signal from the Q output of flip-flop 119. The other 6 bits on bus 32-1 are available for use in signaling status between the transmitter and receiver. For purposes of the present description, the six unspecified status bits need not be employed.

During the transmission mode, the 16-bit sync word on bus 32-2 is parallel loaded by the operation of the LOAD PRE signal into the shift register 117. At the same time, the parity generator 116 loads a 1-bit parity bit into shift register 117 to provide for odd parity. After the single shot 113 times out, the LOAD PRE signal becmes a logical 0 switching shift register 117 to a serial in/out mode. During the transmission mode, the 24-bit output bus 33 connects to the parity generator 116 to allow generation of the correct bit. The comparator 124 is held disabled during the transmission mode so that the AND gate 125 remains disabled and no OSC SYNC pulses are generated.

In the receiver processor 12-2, the control switch for the multiplexers 120 through 123 is switched to the REC position and the lower input to each of the multiplexers is selected. Multiplexer 120 selects a "0" input which holds the shift register 117 always in the serial in/out mode. The data input to shift register 117 is the RX DATA selected by multiplexer 121.

Data is clocked into and out from shift register 117 by operation of the MAS CLK signal selected by multiplexer 122.

In the receiver, comparator 124 when enabled is continually comparing a 16-bit field of shift register 24 appearing on bus 33-2 with a 16-bit sync word field from the sync word store 115. Comparator 124 is enabled by the output from multiplexer 123 when the PRE G signal is a logical 1. The output from comparator 124 is provided as one input from the AND gate 125. Gate 125 also requires an enable input from the parity tester 116. Parity tester 116 provides a logical 1 output to enable gate 125 provided no pariy error occurs in the data in shift register 117. Provided the enable inputs are available from comparator 124 and parity tester 116, and gate 125 passes the MAS CLK signal selected by multiplexer 122 to form the OSC SYNC signal. The OSC SYNC signal provides the clock input to counter 107 and the preset input to the master counter 105.

Dual Data Buffer — FIG. 11

In FIG. 11, further details of the dual data buffer 21 of the electronic processor of FIG. 2 are shown.

The FRAME DATA from the shift register 117 of FIG. 11 is input through a multiplexer 150 either to a first register 151 or to a second shift register 152 depending upon the control (C) input of multiplexer 150. In a similar manner, the output data from one or the other of the shift registers 151 and 152 is selected by the multiplexer 153 as the input to a multiplexer 154. Multiplexer 154 in the transmitter processor 12-1 connects the output data to the TX line and for the receiver processor 12-2 to the video write data line VID WRITE DATA. The selection of the inputs to and outputs from the shift registers 151 and 152 is under control of the BUF SEL line. When the BUF SEL line is a logical 1, the FRAME DATA input data is loaded into the shift register 151 at the same time that the output data to multiplexer 154 is unloaded from the shift register 152. The clock rate for loading data into and unloading data from the shift registers 151 and 152 is under control of the multiplexers 156 and 157. Multiplexers 156 and 157 are controlled by the BUF SEL signal.

When the BUF SEL signal selects the FRAME DATA to be loaded into shift register 151, multiplexer 157 selects the SAM CLK signal to clock that data into register 151 and at the same time, multiplexer 156 selects the MAS CLK signal to clock data out from shift register 152. When the BUF SEL line connects the input data to shift register 152 and the output data from shift register 151, the SAM CLK signal clocks shift register 152 and the MAS CLK signal clocks shift register 151. The dual data buffer of FIG. 11 therefore operates at two different clock rates established by SAM CLK and MAS CLK, one for input of data and a second one for output of data, respectively.

OPERATION

Referring to FIG. 3, input copy 25 is scanned a line at a time in the direction of line 46. In order for a line of the copy 25 to be scanned, the galvanometer 33 is driven by the GAL DR signal to rotate the mirror 32. The GAL DR signal is generated by the read electronic processor 12-1 of FIG. 1 and particularly the galvanometer control 15 of FIG. 7.

Referring to FIG. 2, the master oscillator 18 is generating the MAS CLK signal at a fixed first frequency (6 × $10^6$Hz). The MAS CLK signal is input to the data sampler 20 of FIG. 2 and FIG. 10.

In FIG. 10, the MAS CLK signal clocks the master counter 105 causing counter 150 to count. When counter 105 reaches a count of 13,312 the decoded output on line 130 resets the counter to the 0 count. Referring to FIG. 12, an initial reset of counter 105 is indicated at time t1 in the MAS CTR waveform. After being reset at $t1$, counter 105 again counts up to a count of 13,312 and is again reset at $t2$. Similarly, counter 105 reaches a maximum count and is reset at $t3$ and $t4$.

Just prior to $t1$, it is assumed that the flip-flop 118 stored a logical 0 on its Q output. That logical 0 is indicated by the state of BUF SEL in FIG. 12. With BUF SEL a logical 0, gate 109 in FIG. 10 is inhibited from passing the decoded output on line 127 which occurs at approximately $t1$ time. At time $t1.2$, just prior to time $t2$, a decoded output appears on line 128 in FIG. 10 which clocks flip-flop 118. Flip-flop 118 therefore clocks the BUF SEL line to a logical 1 at time $t1.2$. That 1 enables gate 109 so that when at time $t1.3$, just prior to time $t2$, a decoded output appears on line 127 and gate 109 passes a logical 1pulse on the GAL SOS line as indicated in FIG. 12. The GAL SOS pulse at time $t1.3$ connects to the set input of latch 67 in FIG. 8 causing the latch to be set. When latch 67 in FIG. 8 is set, the Q* output is switched to a logical 0.

The logical 0 input to integrator 65 in FIG. 7 causes the integrator to begin integrating toward a lower level thereby causing the GAL DR signal, as shown in FIG. 12, to be a negative going ramp after time $t1.3$. For the period from $t0.3$ until $t1.3$ the Q* output of latch 67 is a logical 1 so that the GAL DR signal is a positive-going ramp function. Again after $t3.2$, BUF SEL is a logical 1 and the GAL SOS pulse is generated at $t3.3$.

In FIG. 12, GAL DR changes direction going from a positive to a negative slope at times $t1.3$ and $t3.3$ as a result of setting latch 67. At times $t0.3$ and $t2.3$, latch 67 is reset by the operation of detector 66 in FIG. 7 causing GAL DR to go from a negative to a positive slope. The GAL SOS pulses only occur on alternate reversals of GAL SOS at the maximum level. The occurance of the GAL SOS identifies the start of a left to right scan, that is, a scan from position 25-1 to position 25-2 in FIG. 3.

Referring to FIG. 3 and FIG. 12, the GAL DR waveform from $t0.3$ to $t1.3$ represent a scan along line 49 from edge 25-2 to edge 25-1. Similarly, the GAL DR waveform from $t1.3$ to $t2.3$ represents a scan from left to right (e.g. along line 50), that is, from edge 25-1 to edge 25-2. The period of GAL DR from t2.3 to t3.3 represents a scan from edge 25.2 to edge 25.1.

Just prior to the time t1, the flip-flop 119 in FIG. 10 is clocked by the decoded output on line 129 so that the SCAN DIR line is a logical 1 during the scan occuring between t0.2 and t1.2.

In the transmitter processor 12-2 being described, mutliplexer 123 in FIG. 10 has the "0" input selected holding the comparator 124 disabled. With comparator 124 disabled, the gate 125 never becomes satisfied and no OSC SYNC pulse is generated in the transmitter.

Therefore, as far as the transmitter operation is concerned, the operation of the PRE G signal gate 108 and counter circuit 107 can be ignored.

Referring to FIG. 3, the GAL DR signal causes the incident light to scan the mask 36 and generate the VID REF signal. That signal is input to the reference clock generator 16 of FIG. 8 so as to generate, after a delay, the REF CLK signal.

Referring to FIGS. 7 and 12, at times when the galvanometer 33 position (see FIG. 3) is in the extreme ends of scan as occurs at t0.3, t1.3, t2.3, and t3.3 in FIG. 12, REF STR pulses are generated. Those pulses cause the reference counter 111 in FIG. 10 to be reset to a 0 count at times t0.3, t1.3, t2.3 and t3.3. The reference counter 111 of FIG. 10 remains at a 0 count until the REF CLK pulses from FIG. 8 are generated beginning at times t1.1, t2.1, t3.1 and t4.1.

In FIG. 8, REF CLK pulses are not generated until the gate 84 is enabled by the output of gate 83. Gate 83 counts 32 VID REF pulses before enabling the gate 84 at t1.1.

As indicated in FIG. 12, at t1.1, the reference counter 111 of FIG. 10 begins to increment and continues to increment until it reaches a maximum count of 13,312 at t1.1. When counter 112 reaches its maximum count, decoder 112 of FIG. 10 is enabled to fire the single-shot 113. The single-shot 113 generates the LOAD PRE pulse which is applied in FIG. 10 through multiplexer 120 to load the preamble into the shift register 117 at t1.1. At the same time, the output from decoder 112 inhibits gate 114 and causes the SAM CLK clock to be inhibited after t1.1. Counter 111 remains at the maximum count of 13,112 until reset by the next REF STR pulse at time t1.3. Between the time t1.1 and t1.3, counter 111 remains at its maximum count and the output from decoder 112 continues to inhibit gate 114 so that no SAM CLK pulses are generated.

For the period from t1.3 until t2.1, the reference counter 111 remains inactive while the counter 83 is counting the initial 32 pulses of the REF STR. Then again at 2.1 the counter 111 in FIG. 10 commences counting again until it reaches a maximum 13,312 count at t2.1. Thereafter, counter 111 remains at the maximum count until it is reset at time t2.3. At time t2.3, the REF STR pulse resets the counter 111 in FIG. 10 and the counter 83 in FIG. 8. Thereafter counter 33 commences counting its 32 initial VID REF pulses until time t3.1. At time t3.1 counter 111 in FIG. 10 commences counting until t3.1 when it again reaches the maximum count. At time t3.3, the counter is reset and commences counting again after 32 pulses at time t4.1.

Referring to FIG. 12, it is apparent from comparing MAS CTR and REF CTR that the latter does not count for a period t1.1 until t2.1 on either side of the t1 time. This inactive period for the REF CTR allows the MAS CTR to be reset and to cause a change in direction of the drive signal GAL DR which occurs at time t1.3. Accordingly, during the time when the galvanometer 33 of FIG. 3 is changing direction, and hence is likely to be nonuniform, the spatially coded reference signal (REF CLK) is inactive to gate the data signal since no SAM CLK signals are generated.

With the information scanned and recorded for transmission in the input scanner of FIG. 1 as described in connection with the waveforms of FIG. 12, the receiver of FIG. 1 is then operative to scan the output copy.

The operation of the output scanner is also described with reference to the waveforms of FIG. 12.

Referring to FIG. 9, the received data RX from the transmitter is input to the detector 97. The master oscillator of FIG. 9 operates as a bit synchronizer and developes the MAS CLK signal in synchronism with the data rate of the RX signal. Referring to FIG. 12, the waveform MAS CTR is representative of the count in counter 105 of FIG. 10 when that processor is employed in the receiver. The decoded outputs of counter 105 in the receiver are identical to those in the processor. In the receiver, however, the connection of the multiplexers 120 through 123 is for the lower inputs as controlled by the REC switch. The multiplexer 120 continuously holds shift register 117 in the serial shift mode. The multiplexer 121 connects the RX DATA input as the input to shift register 117. The multiplexer 123 connects the PRE G input to enable the comparator 123. The FIG. 10 circuitry differs in the receiver from the transmitter in the PRE G pulses are generated at time t0.3, t1.3, t2.3 and t3.3. The operation of the PRE G pulses at those times are to enable comparator 124. Comparator 124, when enabled, compares the 16-bit field from shift register 117 with the sync word field from the store 150. Since the RX DATA is being stepped a bit at a time through the shift register 117, comparator 124 has a different input from register 117 for each MAS CLK pulse.

As previously discussed, prior to the time that the counter circuit 107 has received 10 OSC SYNC pulses, gate 108 is continuously enabled to generate PRE G pulses. Therefore, during the period when synchronization of the receiver circuitry of FIG. 10 has been synchronized to the RX DATA, comparator 124 is continuously looking at the contents of shift register 117. Each time the sync word in register 117 is located, the OSC SYNC pulse is generated coincident with MASK CLK signal provided that no parity error is generated by parity tester 116. After 10 of the OSC SYNC pulses have been counted by counter circuit 107, the PRE G signal only occurs once per cycle of the master counter 105. Provided the comparator 124 detects the sync word in register 117 at this time, comparator 124 provides an enable output to gate 125. If the proper detection is made and no parity error exists, then the receiver data is in synchronization with the transmitter data on a frame basis. If the OSC SYNC pulse is not generated, then the counter circuit 107 is caused to decrement.

In FIG. 12 and referring to operation of the receiver, it is assumed that the PER G pulses and the OSC SYNC pulses are properly occuring so that synchronization has been established.

With synchronization established, the GAL SOS signal in the receiver drives the galvanometer 33' of FIG. 4 in the same manner as previously described in connection with the galvanometer 33 of FIG. 3. Also in the receiver, the REF CTR and the REF STR waveforms of FIG. 12 are descriptive of operation which occurs in the receiver circuitry.

FURTHER AND OTHER EMBODIMENTS

While the present invention has been described in connection with a half-duplex system with one way transmission from a transmitter to a receiver, full duplex operation is possible in accordance with the present invention. The electronic processor of FIG. 2 has been provided with a capability of being utilized either as the read electronic processor or as the write electronic processor. In order to convert from transmitter to receiver operation, the control switches like those associated with the multiplexers 120 through 123 are switched between TRANS and REC. Referring to FIG. 1, the read electronic processor 12-1 in full duplex operation performs either as the read electronic processor or as the write electronic processor. Similarly, the write electronic processor 12-2 in full duplex operation performs either as a write electronic processor or as a read electronic processor.

For full duplex operation, the optical input scanner 10 of FIG. 1 must include the additional capability of the optical output scanner of FIG. 3. For full duplex operation, the input scanner merely requires the addition of the write laser 54 and associated optics in order to allow the system of FIG. 1.

While the system of FIG. 1 has been described in connection with one transmitter and one receiver, the present invention includes a plurality of receivers that may be handled merely by connecting additional receivers, like receiver 8 of FIG. 1, to the transmission line 22. Those receivers may be identical to the receiver shown and described in connection with FIG. 1 and the other figures of the specification. Alternatively, the data on transmission line 22 or the RX data from demodulator 14 of FIG. 1 may be stored in any conventional digital store such as a magnetic disc file. Thereafter, the data may be accessed from the digital store and supplied as an input to the write electronic processor 12-2. There is no requirement that the data rate at which the RX data is stored into such a digital store be the same rate at which the data is subsequently played back for use in the optical output scanner. In accordance with the present invention, complete flexibility exists in the data transmission rates because spatial synchronization insures that the scanned output copy is an accurate reproduction of the scanned input copy. Because spatial synchronization is coded into the transmitted data, there is no requirement of time synchronization between the transmitter, the receiver, or other digital storage devices.

While the present invention has described one preferred embodiment which employs laser optical input and output scanners the invention also covers other forms of data scanners which may be employed as a source for data transmission.

The present invention has been described in connection with scanners which produce analog signals, for example the VID READ DATA signal. The analog signals are a continuous representation of the light, gray and dark areas on the input copy. The present invention may be employed, however, with other forms of signals such as half-tone representations. Half-tone synthesis is achieved in the present invention by modulating the VID READ DATA signal from photo-multiplier tube 41 in FIG. 4 to form a half-tone signal. For example, the VID READ DATA signal can be summed with a triangular waveform signal having a frequency corresponding to the dot frequency of the half-tone screen. Thereafter the summed signals are passed through a threshold detector to provide the half-tone signal. Thereafter, the half-tone signal is sampled and processed in the same manner as that described for the VID READ DATA signal.

In FIG. 1, the carriage drive signal CAR DR is produced by the electronic processor 12-1 of FIG. 1 for each line scanned. Referring to FIG. 2, the control (CTRL) 9 receives the REF STR signal and reduces the CAR DR signal. Control 9, in an embodiment described, performs no change to the REF STR signal when scanning occurs in both directions across the copy. When scanning in only one direction, the control 9 is a divide-by-2 counter which produces the CAR DR signal at half the REF STR frequency.

In FIGS. 4 and 6, the carriage drivers 42 and 42' are conventional drivers and control circuitry responsive to a digital input pulse provided on the CAR DR line, to step the carriages 39 and 39' and the copies in a direction orthogonal to the scanning direction 46 and 46'. In one embodiment, carriage drivers 42 and 42' are servo motor and control systems, model UNIDEX 800 manufactured by Aerotech Company.

While the invention has been particularly shown and described with reference to preferred embodiments thereof it will be understood by those skilled in the art that various changes in form and details may be made therein without departing from the spirit and the scope of the invention.

What is claimed is:

1. A data facsimile system comprising,
   transmitter means including an input scanner for scanning input copy to form a read data signal representing the input copy, including means for generating a spatial read reference signal during scanning of said input copy, and including means for gating the read data signal with the read reference signal to form a transmission signal,
   receiver means including an output scanner for scanning output copy under control of a write data signal, including means for generating a spatial write reference signal during scanning of said output copy, and including means for gating said transmission signal with said write reference signal to form said write data signal.

2. The apparatus of claim 1 wherein said input and output scanners each includes laser means for generating a light beam having a beam width, a galvanometer controlled mirror for scanning said beam across said copy, a spatial mask for modulating said beam to form said reference signal as a function of the spatial position of the light beam.

3. The apparatus of claim 2 wherein said spatial mask comprises a plurality of opaque first areas alternately arrayed with a plurality of transparent second areas where said first and second areas each have a width which is approximately equal to said beam width.

4. The apparatus of claim 2 wherein said output scanner includes second laser means for generating a second laser beam incident upon said mirror of said galvanometer, said second laser beam scanned coincident with said first laser beam, and includes means for modulating said second laser beam on and off by said write data signal to expose said output copy.

5. The apparatus of claim 2 wherein said transmitter means includes means for scanning said scanning means a line scan at a time, includes detector means for detecting the start of a line scan, and includes transmitter framing means responsive to said detector means for maintaining said read data signal in frames corresponding to line scans by said scanning means.

6. The apparatus of claim 5 wherein said transmitter framing means includes a master counter for counting scanned data bits in a line scan at a first frequency, reference counter means for counting data bits in a line scan at a second frequency, means for gating said read data signal at said second frequency in response to the counting of said reference counter, means for transferring a transmission signal derived from said read data signal between said transmitter means and said receiver means at said first frequency in response to the counting of said master counter.

7. The apparatus of claim 6 including a dual buffer, said dual buffer including a first store for clocking said transmission signal at said first or said second frequency, including a second store for clocking said transmission signal at said first or said second frequency, and including means for controlling the connection of the first and second frequencies to said first and second stores whereby said first store is operating at said second frequency and whereby said first store is operating at said second frequency when said second store is operating at said first frequency.

8. The apparatus of claim 5 wherein said transmitter means includes preamble means for inserting a synchronization word into said transmission signal and wherein said receiver means includes receiver framing means for maintaining said write data signal in frames corresponding to line scans, includes synchronization detection means for detecting said synchronization word, and includes means for resetting said receiver framing means responsive to said synchronization detection means to establish frame synchronization in said receiver means.

9. The apparatus of claim 8 wherein said transmitter framing means includes a first counter for counting at a first frequency, a second counter for counting at a second frequency, means for gating said read data signal at said second frequency to form a sampled data signal, means for transferring said sampled data signal from said transmiter means to said receiver means at said first frequency as a transmission signal, and wherein said receiver means includes means for detecting said first frequency from said transmission signal, a third counter for counting at a third frequency, receiver store means for storing said transmission signal under control of said first frequency, means for gating said receiver store means at said third frequency to form said write data signal from the stored transmission signal.

10. The apparatus of claim 9 wherein third counter includes means for making said third frequency substantially equal to first frequency.

11. The apparatus of claim 9 wherein said receiver store means includes a first store for clocking said transmission signal at said first or said third frequency, including a second store for clocking said transmission signal at said first or said third frequency, and including means for controlling the connection of the first and second frequencies to said first and second stores whereby said first store is operating at the first frequency when said second store is operating at said third frequency, and whereby said first store is operating at said third frequency when said second store is operating at said first frequency.

12. The apparatus of claim 5 wherein said input and output scanners each includes, drive means for driving said copy in a direction orthogonal to said scanning.

13. A data facsimile system comprising,
transmitter means including an input scanner for scanning input copy to form a read data signal representing the input copy, including means for generating a spatial read reference signal during scanning of said input copy, and including means for gating the read data signal with the read reference signal to form a transmission signal,
a plurality of receiver means, each receiver means including an output scanner for scanning output copy under control of a write data signal, including means for generating a spatial write reference signal during scanning of said output copy, and including means for gating said transmission signal with said write reference signal to form said write data signal.

14. The apparatus of claim 13 wherein said input scanner and said output scanners each includes laser means for generating a light beam having a beam width, scanning means for scanning said beam across said copy, a spatial mask for modulating said beam to form said reference signal as a function of the spatial position of the light beam.

15. The apparatus of claim 14 wherein said spatial mask comprises a plurality of opaque first areas alternately arrayed with a plurality of transparent second areas where said first and second areas each have a width which is approximately equal to said beam width.

16. The apparatus of claim 14 wherein said output scanner in each of said receiver means includes second laser means for generating a second laser beam incident upon said scanning means, said second laser beam scanned coincident with said first laser beam, and includes means for modulating said second laser beam on and off by said write data signal to expose said output copy.

17. The apparatus of claim 14 wherein said transmitter means includes means for scanning said scanning means a line scan at a time, includes detector means for detecting the start of a line scan, and includes transmitter framing means responsive to said detector means for maintaining said read data signal in frames corresponding to line scans by said scanning means.

18. The apparatus of claim 17 wherein said transmitter framing means includes a master counter for counting scanned data bits in a line scan at a first frequency, reference counter means for counting data bits in a line scan at a second frequency, means for gating said read data signal at said second frequency in response to the counting of said reference counter, means for transferring a transmission signal derived from said read data signal between said transmitter means and said receiver means at said first frequency in response to the counting of said master counter.

19. The apparatus of claim 18 including a dual buffer, said dual buffer including a first store for clocking said transmission signal at said first or said second frequency, including a second store for clocking said transmission signal at said first or said second frequency, and including means for controlling the connection of the first and second frequencies to said first and second stores whereby said first store is operating at said second frequency and whereby said first store is operating at said second frequency when said second store is operating at said first frequency.

20. The apparatus of claim 17 wherein said transmitter means includes preamble means for inserting a synchronization word into said transmission signal and wherein each of said receiver means includes receiver framing means for maintaining said write data signal in frames corresponding to line scans, includes synchronization detection means for detecting said synchronization word, and includes means for resetting said receiver framing means responsive to said synchronization detection means to establish frame synchronization in said receiver means.

21. The apparatus of claim 17 wherein said input scanner and each of said output scanners each includes, drive means for driving said copy in a direction orthogonal to said scanning.

22. A data facsimile system comprising,
transmitter means including an input scanner for scanning input copy to form a read data signal representing the input copy, including means for generating a spatial read reference signal during scanning of said input copy, and including means for gating the read data signal with the read reference signal to form a transmission signal,
receiver means including an output scanner for scanning output copy under control of a write data signal, said output scanner including means for generating first and second beams, including means for scanning said first and second beams across said output copy, including means for modulating said first beam to form a write reference signal as a function of the spatial position of the first beam, including means for gating said transmission signal with said write reference signal to form said write data signal, and including means for modulating said second beam by said write data signal to form said output copy.

23. The apparatus of claim 22 wherein said means for scanning includes a galvanometer controlled mirror.

* * * * *